United States Patent
Koike

(10) Patent No.: US 8,464,220 B2
(45) Date of Patent: Jun. 11, 2013

(54) WEB SERVER, WEB APPLICATION TEST METHOD, AND WEB APPLICATION TEST PROGRAM

(75) Inventor: Yoshio Koike, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1529 days.

(21) Appl. No.: 11/808,004

(22) Filed: Jun. 5, 2007

(65) Prior Publication Data

US 2007/0245315 A1    Oct. 18, 2007

Related U.S. Application Data

(63) Continuation of application No. PCT/JP2005/000028, filed on Jan. 5, 2005.

(51) Int. Cl.
*G06F 9/44* (2006.01)

(52) U.S. Cl.
USPC .......................................... 717/124; 717/127

(58) Field of Classification Search
USPC ................................................ 717/124–135
See application file for complete search history.

(56) References Cited

U.S. PATENT DOCUMENTS

| | | | |
|---|---|---|---|
| 6,044,398 A * | 3/2000 | Marullo et al. | 709/219 |
| 6,085,224 A * | 7/2000 | Wagner | 709/203 |
| 6,151,599 A * | 11/2000 | Shrader et al. | 1/1 |
| 6,157,940 A * | 12/2000 | Marullo et al. | 703/27 |
| 6,185,701 B1 * | 2/2001 | Marullo et al. | 714/38.14 |
| 6,347,398 B1 * | 2/2002 | Parthasarathy et al. | 717/178 |
| 6,374,359 B1 * | 4/2002 | Shrader et al. | 726/5 |
| 6,516,053 B1 * | 2/2003 | Ryan et al. | 379/21 |
| 6,701,514 B1 * | 3/2004 | Haswell et al. | 717/115 |
| 6,880,129 B1 * | 4/2005 | Lee et al. | 715/763 |
| 6,907,546 B1 * | 6/2005 | Haswell et al. | 714/38.11 |
| 6,954,220 B1 * | 10/2005 | Bowman-Amuah | 715/741 |
| 7,127,713 B2 * | 10/2006 | Davis et al. | 717/177 |
| 7,197,559 B2 * | 3/2007 | Goldstein et al. | 709/224 |
| 7,284,161 B2 * | 10/2007 | Dallaway | 714/47.1 |
| 7,334,220 B2 * | 2/2008 | Chang et al. | 717/126 |
| 7,395,526 B2 * | 7/2008 | Arcand | 717/127 |

(Continued)

FOREIGN PATENT DOCUMENTS

| | | |
|---|---|---|
| JP | 62-70943 | 4/1987 |
| JP | 62-070943 | 4/1987 |

(Continued)

OTHER PUBLICATIONS

Liu, Chien-Hung, et al. "Structural testing of web applications." Software Reliability Engineering, 2000. ISSRE 2000. Proceedings. 11th International Symposium on. IEEE, 2000.*

(Continued)

*Primary Examiner* — Wei Zhen
*Assistant Examiner* — Matthew Brophy
(74) *Attorney, Agent, or Firm* — Staas & Halsey LLP

(57) ABSTRACT

A web server 2 capable of performing a test of a web application comprises: a web application processing section 22 that performs processing for POST data received from a client 1 and, based on the processing result, generates a document to be transmitted to the client 1; and a test processing section 21 that embeds a test program for automatically transmitting the POST data from the client 1 to the web server 2 in the document to allow the client 1 to execute the test program when the test of a web application is performed.

18 Claims, 4 Drawing Sheets

U.S. PATENT DOCUMENTS

| | | | |
|---|---|---|---|
| 7,461,369 B2 * | 12/2008 | Zhao et al. | 717/131 |
| 7,634,772 B2 * | 12/2009 | Parthasarathy et al. | 717/178 |
| 7,698,688 B2 * | 4/2010 | Fujiwara et al. | 717/126 |
| 7,707,564 B2 * | 4/2010 | Marvin et al. | 717/140 |
| 7,757,175 B2 * | 7/2010 | Miller | 715/738 |
| 7,877,736 B2 * | 1/2011 | Houh et al. | 717/131 |
| 2001/0028359 A1 | 10/2001 | Muraishi et al. | 345/700 |
| 2004/0205570 A1 | 10/2004 | Tonomura | 715/513 |
| 2005/0086643 A1 * | 4/2005 | Shane | 717/124 |
| 2006/0101404 A1 * | 5/2006 | Popp et al. | 717/124 |

FOREIGN PATENT DOCUMENTS

| | | |
|---|---|---|
| JP | 2001-125853 | 5/2001 |
| JP | 2001-356936 | 12/2001 |
| JP | 2002-082926 | 3/2002 |
| JP | 2003-44318 | 2/2003 |
| JP | 2003-233585 | 8/2003 |
| JP | 2004-094635 | 3/2004 |

OTHER PUBLICATIONS

Offutt, Jeff, et al. "Bypass testing of web applications." Software Reliability Engineering, 2004. ISSRE 2004. 15th International Symposium on. IEEE, 2004.*

A. Hartman and K. Nagin. 2004. The AGEDIS tools for model based testing. SIGSOFT Softw. Eng. Notes 29, 4 (Jul. 2004), 129-132.*

Imamuma, M. et al., "An Input Method of XML Documents by a WWW Browser," Mitsubishi Electric Corporation, Information Technology R&D Center.

International Search Report issued Apr. 26, 2005 in PCT Application No. PCT/JP2005/000028.

International Preliminary Report on Patentability, mailed Jul. 10, 2007, in corresponding International Application No. PCT/JP2005/000028 (5 pp.).

* cited by examiner

FIG. 3

| POST number | Input area 1 setting data | Input area 2 setting data | | Input area N setting data |
|---|---|---|---|---|
| 0 | $dat01 | $dat0N | ·· | $dat0N |
| 1 | $dat11 | $dat12 | ·· | $dat1N |
| 2 | $dat21 | $dat22 | ·· | $dat2N |
| : | : | : | | : |
| M | $datM1 | $datM2 | ·· | $datMN |

FIG. 4

```
<form name="form1" action="/cgi-bin/cgi_apl" method="POST">
  <input type="text" size="10" name="data01" value="$dat01">
              :         :
  <input type="text" size="10" name="data0N" value="$dat0N">
  <input type="hidden" size="10" name="seqData" value="$seqDat">
  <input type="submit" value=" Execution " name="start">
</form>
```

FIG. 5

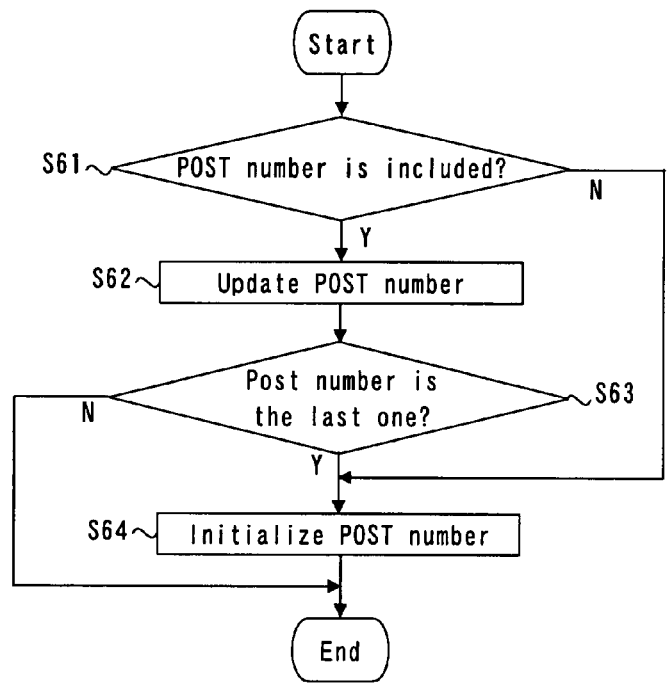

FIG. 6

```
<SCRIPT LANGUAGE="JavaScript">
function func1(){
    setTimeout(document.form1.submit(),$waitTime);
}
</SCRIPT>
<body onload="func1()">
```

WEB SERVER, WEB APPLICATION TEST METHOD, AND WEB APPLICATION TEST PROGRAM

This application is a continuation of International Application No. PCT/JP2005/000028, filed Jan. 5, 2005, the disclosure of which is herein incorporated in its entirety by reference.

TECHNICAL FIELD

The present invention relates to a web application test server that performs a test of a web application system with user's operation for a web browser on his or her client machine automated.

BACKGROUND ART

An operation check before official operation needs to be performed in a web application system in which a web server performs various processing in response to user's operation made for a web browser on his or her client machine. Conventionally, the operation check has been performed by preparing a large number of test clients and corresponding large number of test users and by having the test users operate the web browsers on the test clients in the same manner as official operation time.

Further, a client simulation program has been used for the operation check. The client simulation program has the test users operate the web browsers on the test clients in the same manner as official operation time and traces data transmitted and received between the client and web server to acquire trace data and, afterward, repeats operation according to the trace data.

As a prior art relating to the present invention, there is known Patent Document 1 described below. A session management method in a web application disclosed in Patent Document 1 repeats transmission/reception of request data at given intervals independently of user's operation on the client machine to thereby confirm an existence of a connection called "session".

Patent Document 1: Jpn. Pat. Appln. Laid-Open Publication No. 2003-233585 (pages 4 to 5, FIG. 1)

DISCLOSURE OF INVENTION

However, the preparation of a large number of test clients and corresponding large number of test users increases cost. Further, the client simulation program can only repeat preset operations and, therefore, cannot obtain test results by changing conditions such as timing, data, or load. Further, a display content of the web browser on the client cannot be grasped.

The present invention has been made to solve the above problems, and an object thereof is to provide a web server, a web application test method, and a web application test program capable of effectively performing an operation check without requiring operations on a client.

Means for Solving the Problem

To solve the above problems, according to the present invention, there is provided a web server capable of performing a test of a web application, comprising: a web application processing section that performs processing for POST data received from a client and, based on the processing result, generates a document to be transmitted to the client; and a test processing section that embeds a test program for automatically transmitting the POST program from the client to the web server in the document to allow the client to execute the test program when the test of a web application is performed.

In the web server according to the present invention, the document is displayed in a web browser on the client, followed by execution of the test program.

In the web server according to the present invention, in the case where the processing result of the web application processing section is abnormal, the test processing section embeds information concerning the abnormality in the document to allow the client to display the information concerning the abnormality.

In the web server according to the present invention, the test processing section determines the waiting time of the client, and the test program transmits the POST data after the waiting time has elapsed.

In the web server according to the present invention, the test program includes a value of the waiting time in the POST data to transmit the value of the waiting time from the client to the web server, and based on the waiting time included in the POST data received from the client, the test processing section determines the waiting time in the next test program.

In the web server according to the present invention, the document includes at least one input area for a user to input data, the test processing section determines input area setting data which is data set in the input area, and the test program inputs the input area setting data in the input area.

In the web server according to the present invention, the test program includes a POST number which is a number of the POST data, and the test processing section determines the input area setting data based on the POST number and updates the POST number.

The web server according to the present invention further comprises a test data storage section that previously stores choices of the input area setting data for each input area, wherein the test processing section determines the input area setting data by selecting it from the choices of the input area setting data stored in the test data storage section.

The web server according to the present invention further comprises a test data storage section that previously stores a range of the input area setting data for each input area, wherein the test processing section determines the input area setting data within the range of the input area setting data stored in the test data storage section.

In the web server according to the present invention, the test program includes a range specification of numerical values in the POST data to transmit the range specification from the client to the web server, and based on the range specification included in the POST data received from the client, the test processing section determines the input area setting data in the next test program.

According to the present invention, there is provided a web application test method that performs a test of a web application in a web server, comprising: a web application processing step that performs processing for POST data received from a client and, based on the processing result, generates a document to be transmitted to the client; and a test processing step that embeds a test program for automatically transmitting the POST data from the client to the web server in the document to allow the client to execute the test program when the test of a web application is performed.

In the web application test method according to the present invention, the document is displayed in a web browser on the client, followed by execution of the test program.

In the web application test method according to the present invention, in the case where the processing result of the web application processing step is abnormal, the test processing section embeds information concerning the abnormality in the document to allow the client to display the information concerning the abnormality.

In the web application test method according to the present invention, the test processing step determines the waiting time of the client, and the test program transmits the POST data after the waiting time has elapsed.

In the web application test method according to the present invention, the test program includes a value of the waiting time in the POST data to transmit the value of the waiting time from the client to the web server, and based on the waiting time included in the POST data received from the client, the test processing step determines the waiting time in the next test program.

In the web application test method according to the present invention, the document includes at least one input area for a user to input data, the test processing step determines input area setting data which is data set in the input area, and the test program inputs the input area setting data in the input area.

In the web application test method according to the present invention, the test program includes a POST number which is a number of the POST data, and the test processing step determines the input area setting data based on the POST number and updates the POST number.

The web application test method according to the present invention further comprises a test data storage step that previously stores choices of the input area setting data for each input area, wherein the test processing step determines the input area setting data by selecting it from the choices of the input area setting data stored by the test data storage step.

The web application test method according to the present invention further comprises a test data storage step that previously stores a range of the input area setting data for each input area, wherein the test processing step determines the input area setting data within the range of the input area setting data stored by the test data storage step.

In the web application test method according to the present invention, the test program includes a range specification of numerical values in the POST data to transmit the range specification from the client to the web server, and based on the range specification included in the POST data received from the client, the test processing step determines the input area setting data in the next test program.

According to the present invention, there is provided a web application test program allowing a computer to execute a web application test method that performs a test of a web application in a web server, comprising: a web application processing step that performs processing for POST data received from a client and, based on the processing result, generates a document to be transmitted to the client; and a test processing step that embeds a test program for automatically transmitting the POST data from the client to the web server in the document to allow the client to execute the test program when the test of a web application is performed.

BRIEF DESCRIPTION OF DRAWINGS

FIG. 3 is a table showing an example of an input area setting data table according to the present invention;

FIG. 4 is a source code showing an example of an input area setting script according to the present invention;

FIG. 5 is a flowchart showing an example of processing for a POST number according to the present invention; and FIG. 6 is a source code showing an example of a script for continuation according to the present invention.

BEST MODE FOR CARRYING OUT THE INVENTION

An embodiment of the present invention will be described below with reference to the accompanying drawings.

A configuration of a web application test system according to the present invention will first be described.

Figure 1:
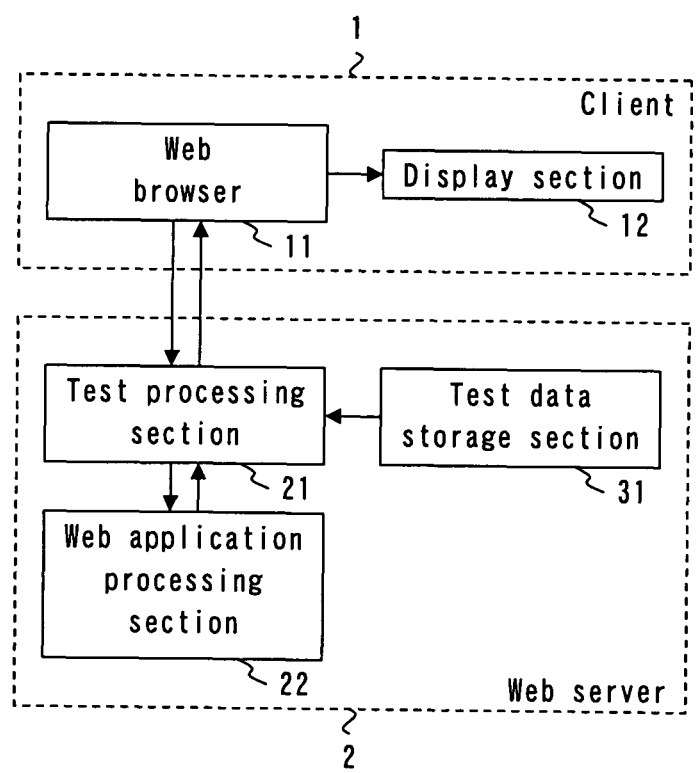
FIG. 1 is a block diagram showing an example of a configuration of a web application test system according to the present invention.

FIG. 1 is a block diagram showing an example of a configuration of the web application test system according to the present invention. This web application test system includes a client 1 and a web server 2. The client 1 is provided with a web browser 11 and a display section 12. The web server 2 is provided with a test processing section 21, a web application processing section 22, and a test data storage section 31.

An HTML document is transmitted from the web server 2 to the client 1. The HTML document is interpreted in the web browser 11 and displayed on the display section 12. The HTML document includes at least one input area for a user to input data in official operation time and a Submit button for instructing transmission of POST data. At official operation time, the user of the client 1 first inputs data in the input area and then depresses the Submit button to transmit the input data. Transmitted from the client 1 to the web server 2 is POST data. The POST data includes input area-acquisition data which is data input in the input area.

An operation of the web server according to the present invention will be described.

Figure 2:
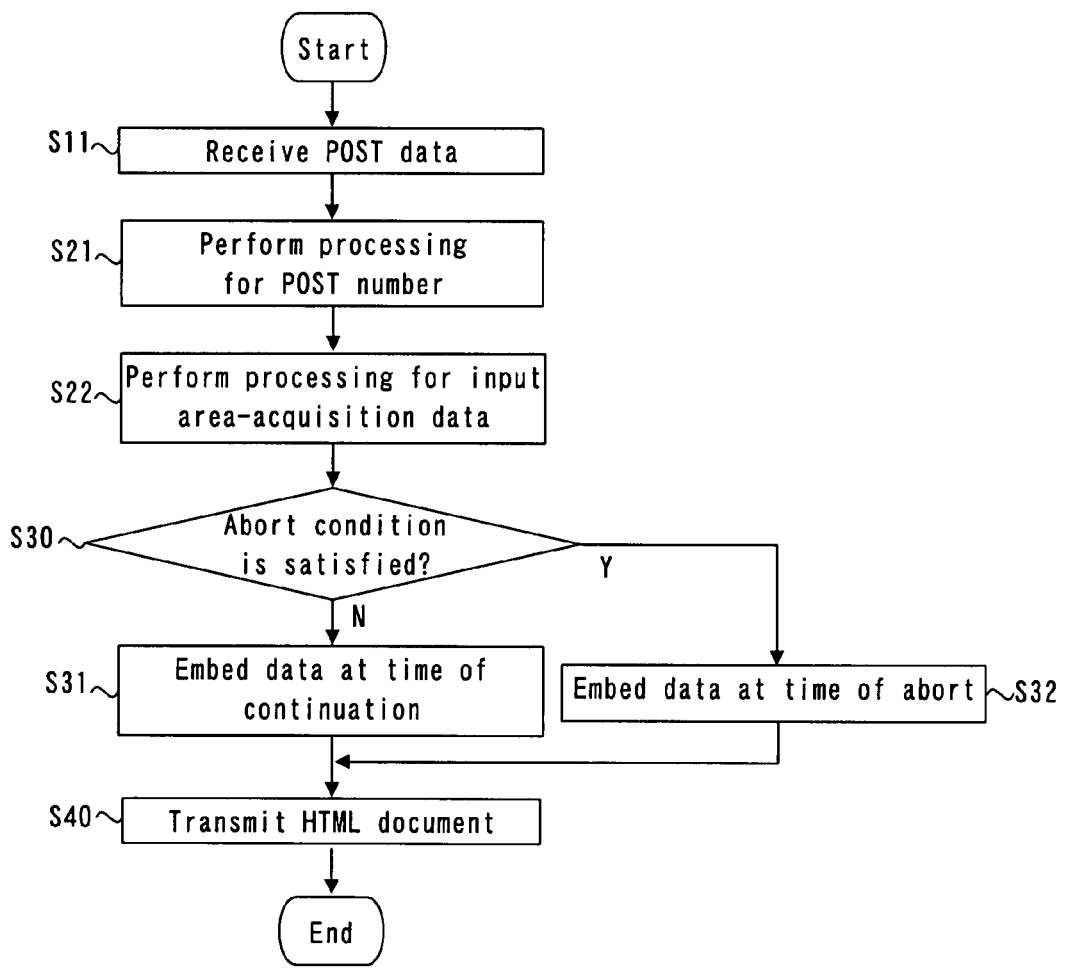
FIG. 2 is a flowchart showing an example of operation of a web server according to the present invention.

FIG. 2 is a flowchart showing an example of operation of the web server according to the present invention. The test processing section 21 receives POST data transmitted from the client 1 (S11). The POST data includes a POST number and the like for use in the test as well as the input area-acquisition data. The test processing section 21 then performs processing for the POST number (S21). Then, the web application processing section 22 performs processing for the received input area-acquisition data and, based on the processing result, generates an HTML document to be transmitted to the client 1 (S22). Then, the test processing section 21 determines whether an abort condition is satisfied or not (S30). The abort condition is, e.g., that the processing result concerning the input area-acquisition data shows an abnormality.

In the case where the abort condition is not satisfied (N in S30), the test processing section 21 embeds data at the time of continuation in the HTML document (S31), transmits the HTML document (S40), and ends this flow. Generation of the HTML document at the time of continuation will here be described. The test processing section 21 embeds, in the HTML document generated by the web application processing section 22, script for continuation which is a script for automatically continuing the test, waiting time for the client 1 to automatically transmit the POST data, input area setting data which is data set in the input area in place of the input area-acquisition data, POST number which is a number assigned to the POST data, continuous time display information for displaying notification of continuation of the test, and the like.

On the other hand, in the case where the abort condition is satisfied (Y in S30), the test processing section 21 embeds data at the time of abort in the HTML document (S32) and shifts to step S40. Generation of the HTML document at the time of abort will here be described. The test processing section 21 embeds, in the HTML document generated by the web application processing section 22, script for abort which is a script for aborting the test, abort time display information for displaying notification of abort of the test, and the like.

After completion of the flow of FIG. 2, the web server 2 starts the flow once again.

The embedding of the input area setting data and POST number will be described.

It is assumed here that the input area setting data corresponding to the POST number is embedded and that the POST number is embedded as non-input area setting data. The non-input area setting data means data that is not displayed unlike the input area setting data but is included in the POST data.

Assume that the number of input areas in the HTML document is N and POST number ranges from 0 to M. The input area setting data is necessary for each POST number and each input area, so that an input area setting data table having (M+1)×N input area setting data is previously stored in the test data storage section 31. FIG. 3 is a table showing an example of the input area setting data table according to the present invention. In this table, a set of input area setting data corresponding to respective POST numbers is represented as a row, and a set of input area setting data corresponding to respective input areas is represented as a column.

FIG. 4 is a source code showing an example of an input area setting script according to the present invention. $dat01 to $dat0N are input area setting data of input areas 1 to N in the case of POST number=0. The execution of the source code allows a value to be automatically input in the input area on the web browser 11 and included in the POST data. $seqDat represents POST number, which is not displayed as the non-input area setting data and is included in the POST data directly.

Although the above embedding of the input area setting data is performed depending on the POST number, the input area setting data may be selected independently of the POST number from the input area setting data table and embedded. In this case, the input area setting data table having S×N input area setting data is previously prepared, where S is the number of choices of the input area setting data. The test processing section 21 randomly selects one from S input area setting data for each input area, or selects one in series from S input area setting data for each input area and embeds the selected one in the HTML document as input area setting data of a corresponding input area.

In the case where the input area setting data is a numerical value, values falling within a predetermined range may be embedded as the input area setting data. In this case, starting and ending values are previously set for each input area in the test data storage section 31. The test processing section 21 determines for each input area a value within the range specified by the starting and ending values and embeds the determined one in the HTML document as the input area setting data. The predetermined value may be determined randomly, in ascending order, in descending order, or the like.

Further, a configuration may be employed in which the test processing section 21 embeds a range specification of the numerical values in the HTML document as the non-input area setting data and the test processing section 21 that has received the POST data determines the next input area setting data according to the range specification included in the POST data.

Processing for the POST number will next be described.

The POST number counts the POST data transmitted from the same web browser 11 of the same client 1. FIG. 5 is a flowchart showing an example of processing for the POST number according to the present invention. The test processing section 21 determines whether a POST number is included in received POST data (S61).

In the case where the POST number is not included (N in S61), the test processing section 21 shifts to step S64. On the other hand, in the case where the POST number is included (Y in S61), the test processing section 21 adds 1 to the POST number to update the POST number (S62). The test processing section 21 then determines whether the POST number is the last number that has been previously set (S63). In the case where the POST number is not the last one (N in S63), the test processing section 21 ends this flow. On the other hand, in the case where the POST number is the last one (Y in S63), the test processing section 21 initializes the POST number (S64) and ends this flow.

The above processing for the POST number allows POST data processing to be performed in correspondence with the number of times the data is posted from the web browser 11 of a given client 1. Thus, the POST data processing can be confirmed in an orderly fashion.

Although the POST number is used in the present embodiment, data processing may be performed independently of the number of times the data is posted from the client without using the POST number.

The embedding of the script for continuation and script for abort will next be described.

The script for continuation and script for abort are previously stored in the test data storage section 31. The script for continuation is, e.g., a script that sets input area setting data in an input area and, after a predetermined waiting time, executes automatic depression of the Submit button in an HTML document. The script for abort is, e.g., a script that does not execute the automatic depression of the Submit button.

FIG. 6 is a source code showing an example of the script for continuation according to the present invention. The script for continuation utilizes onload to execute automatic depression of the Submit button. $waitTime is a numerical value representing waiting time. The waiting time is a predetermined value previously stored in the test data storage section 31, a value randomly set within a predetermined range previously stored in the test data storage section 31, or a value taken out in series from a table previously stored in the test data storage section 31.

The script for continuation may be structured such that $waitTime in the script for continuation is included in the POST data in the client 1 so as to be transmitted to the web server 2. In this case, further, the test processing section 21 may calculate $waitTime for use in the next script for continuation based on a value of received $waitTime. The test processing section 21 uses a predetermined rule (for example, the test processing section 21 adds 1 to a value of received $waitTime) to calculate the next $waitTime.

As described above, by embedding of the script for continuation or script for abort in the HTML document, it is possible to control repetition of POST of the client depending on the test condition. Further, since the waiting time can arbitrarily be set, a variation between users can be simulated.

Although the test is infinitely repeated until the processing result has been determined to be abnormal in the above example, the test may be ended when the number of times of POST from the client reaches a predetermined number of times of repetitions. In this method, the POST number is compared with a predetermined number of times of repetitions. If the POST number has not reached the predetermined number of times of repetitions, the script for continuation is embedded in the HTML document while if the POST number has reached the predetermined number of times of repetitions, the script for abort is embedded in the HTML document.

Although only one client 1 is used in the present embodiment, a plurality of clients 1 may be used. Even if a plurality of clients 1 are used in the test, it is possible to easily perform the test at low cost without users. Further, although only one web browser 11 operates on one client 1 in the present embodiment, a plurality of web browsers 11 are allowed to operate in one client 1. By allowing a plurality of web browsers 11 to operate in one client as described above, it is possible to perform, without users, a test in which a plurality of clients and a plurality of users are assumed with a small number of client and at low cost.

Further, it is possible to provide a program that allows a computer constituting the web server to execute the above steps as a web server program. By storing the above program in a computer-readable storage medium, it is possible to allow the computer constituting the web server to execute the program. The computer-readable medium mentioned here includes: a portable storage medium such as a CD-ROM, a flexible disk, a DVD disk, a magneto-optical disk, or an IC card; a database that holds computer program; another computer and database thereof; and a transmission medium on a network line.

A test program corresponds to the script for continuation in the embodiment.

INDUSTRIAL APPLICABILITY

According to the present invention, even if a plurality of clients 1 are used in the test, it is possible to easily perform the test at low cost without users. By allowing a plurality of web browsers to operate in one client, it is possible to perform, without users, a test in which a plurality of clients and a plurality of users are assumed with a small number of client and at low cost. By embedding the script for continuity or script for abort in the HTML document, it is possible to control repetition of POST of the client depending on the test condition. Further, by arbitrarily setting the waiting time, it is possible to simulate a variation between users. Further, POST data processing can be performed in correspondence with the number of times the data is posted. Thus, the POST data processing can be confirmed in an orderly fashion.

The invention claimed is:

1. A web application test method that performs a test of a web application in a web server, the method comprising:
    performing processing for POST data received from a client and, based on the processing result, generating a document to be transmitted to the client, the document including at least one input area for a user; and
    determining input area setting data to be set in the input area of the document, and embedding a test program for automatically transmitting the POST data from the client to the web server in the document to allow the client to execute the test program when the test of a web application is performed, wherein
    the test program includes a POST number which is a number of the POST data,
    the determining and embedding determines the input area setting data based on the POST number and updates the POST number,
    the test program executed on the client inputs the input area setting data in the input area,
    the determining and embedding determines the input area setting data by referring to a test data storage section included in the web server, and
    when a number of the at least one input area is N and the POST number ranges from 0 to M, the test data storage section includes (M+1)×N input area setting data.

2. The web application test method according to claim 1, wherein the document is displayed in a web browser on the client, followed by execution of the test program.

3. The web application test method according to claim 1, wherein
    in the case where the processing result is abnormal, the determining and embedding embeds information concerning the abnormality in the document to allow the client to display the information concerning the abnormality.

4. The web application test method according to claim 1, wherein
    the determining and embedding determines the waiting time of the client, and
    the test program transmits the POST data after the waiting time has elapsed.

5. The web application test method according to claim 4, wherein
    the test program includes a value of the waiting time in the POST data to transmit the value of the waiting time from the client to the web server, and
    based on the waiting time included in the POST data received from the client, the determining and embedding determines the waiting time in a next test program.

6. The web application test method according to claim 1, further comprising:
    previously storing choices of the input area setting data for each input area, wherein
    the determining and embedding determines the input area setting data by selecting it from the choices of the input area setting data stored by the previously storing.

7. The web application test method according to claim 1, further comprising:
    previously storing a range of the input area setting data for each input area, wherein
    the determining and embedding determines the input area setting data within the range of the input area setting data stored by the previously storing.

8. The web application test method according to claim 1, wherein
    the test program includes a range specification of numerical values in the POST data to transmit the range specification from the client to the web server, and
    based on the range specification included in the POST data received from the client, the determining and embedding determines the input area setting data in a next test program.

9. A non-transitory computer-readable medium having recorded thereon a program that causes a web server connected to a client to execute a process comprising:
    performing processing for POST data received from a the client and, based on the processing result, generating a document to be transmitted to the client, the document including at least one input area for a user; and
    determining input area setting data to be set in the input area of the document, and embedding a test program for automatically transmitting the POST data from the client to the web server in the document to allow the client to execute the test program when the test of a web application is performed, wherein
    the test program includes a POST number which is a number of the POST data, the determining and embedding determines the input area setting data based on the POST number and updates the POST number, the test program executed on the client inputs the input area setting data in the input area, the determining and embedding determines the input area setting data by referring to a test data storage section included in the web server, and when a number of the at least one input area is N and the POST number ranges from 0 to M, the test data storage section includes (M+1)×N input area setting data.

10. The non-transitory computer-readable medium according to claim 9, wherein
the document is displayed in a web browser on the client, followed by execution of the test program.

11. The non-transitory computer-readable medium according to claim 9, wherein
in the case where the processing result is abnormal, the determining and embedding embeds information concerning the abnormality in the document to allow the client to display the information concerning the abnormality.

12. The non-transitory computer-readable medium according to claim 9, wherein
the determining and embedding determines the waiting time of the client, and
the test program transmits the POST data after the waiting time has elapsed.

13. The non-transitory computer-readable medium according to claim 12, wherein
the test program includes a value of the waiting time in the POST data to transmit the value of the waiting time from the client to the web server, and
based on the waiting time included in the POST data received from the client, the determining and embedding determines the waiting time in the next test program.

14. The non-transitory computer-readable medium according to claim 9, wherein the process further comprises:
previously storing choices of the input area setting data for each input area,
the determining and embedding determines the input area setting data by selecting it from the choices of the input area setting data stored by the previously storing.

15. The non-transitory computer-readable medium according to claim 9, wherein the process further comprises:
previously storing a range of the input area setting data for each input area,
the determining and embedding determines the input area setting data within the range of the input area setting data stored by the previously storing.

16. The non-transitory computer-readable medium according to claim 9, wherein
the test program includes a range specification of numerical values in the POST data to transmit the range specification from the client to the web server, and
based on the range specification included in the POST data received from the client, the determining and embedding determines the input area setting data in the next test program.

17. The method used in a system including a web server and a client that connected to the web server, the method comprising:
receiving, using the web server, POST data from the client;
updating, using the web server, a POST number when the received POST data includes the POST number;
performing, using the web server, processing of POST data;
generating, using the web server, a document based on the processing result, the document including at least one input area for a user;
determining, using the web server, input data setting data based on the updated POST number;
embedding, using the web server, a test program for automatically transmitting POST data from the client to the web server, and the input data setting data in the document;
determining the input area setting data by referring to a test data storage section included in the web server;
including (M+1)×N input area setting data when a number of the at least one input area is N and the POST number ranges from 0 to M;
transmitting, using the web server, the document to the client; and
executing, by using the client, the test program so as to input the input area setting data in the at least one input area.

18. The web application test method according to claim 4, wherein the waiting time is selected from the group consisting of:
a predetermined value,
a value randomly set within a predetermined range, and
a value taken out in series from a table.

\* \* \* \* \*

UNITED STATES PATENT AND TRADEMARK OFFICE
CERTIFICATE OF CORRECTION

PATENT NO. : 8,464,220 B2
APPLICATION NO. : 11/808004
DATED : June 11, 2013
INVENTOR(S) : Yoshio Koike It is certified that error appears in the above-identified patent and that said Letters Patent is hereby corrected as shown below:

In the Claims:

Column 8, Line 56, In Claim 9, delete "a the" and insert -- the --, therefor.

Signed and Sealed this
Eighth Day of October, 2013

Teresa Stanek Rea
*Deputy Director of the United States Patent and Trademark Office*